United States Patent [19]

Bruno et al.

[11] Patent Number: 5,277,105
[45] Date of Patent: Jan. 11, 1994

[54] LOW PROFILE STACKABLE CONVEYOR OVEN

[75] Inventors: Adrian A. Bruno, Rolling Meadows; Richard J. Casanzio, Deerfield; Thomas Diwisch, Des Plaines; Hector Gonzalez, Schiller Park, all of Ill.; Bacigalupe Carlos, The Colony, Tex.; John R. Norris, Plaino, Tex.; Sushil Eapen, Niles, Ill.; Loren Veltrop, Deerfield, Ill.

[73] Assignee: Middleby Marshall Corporation, Morton Grove, Ill.

[21] Appl. No.: 891,281

[22] Filed: May 29, 1992

[51] Int. Cl.⁵ .......................... A21B 1/00; A23L 3/00; F24C 15/32
[52] U.S. Cl. ..................... 99/443 C; 99/386; 99/476; 99/477; 126/19 R; 126/21 A; 432/145; 432/152
[58] Field of Search .................. 99/373, 386, 389, 423, 99/447, 443 R, 443 C, 474–477; 34/160, 223, 231; 126/19 R, 21 R, 21 A, 91 A, 39 D; 219/388, 400; 431/171; 432/59, 143, 145, 152, 194

[56] References Cited

U.S. PATENT DOCUMENTS

| 4,462,383 | 7/1984 | Henke et al. | 34/160 |
| 4,474,498 | 10/1984 | Smith | 432/152 |
| 4,576,090 | 3/1986 | Burtea | 99/476 |
| 4,626,661 | 12/1986 | Henke | 219/388 |
| 4,716,820 | 1/1988 | Stuck | 99/443 C |
| 4,753,215 | 6/1988 | Kaminski et al. | 432/145 |
| 4,757,800 | 7/1988 | Shei et al. | 126/21 A |
| 4,881,519 | 11/1989 | Henke | 99/477 |
| 4,884,552 | 12/1989 | Wells et al. | 126/19 R |
| 5,025,775 | 6/1991 | Crisp | 126/21 A |
| 5,131,841 | 7/1992 | Smith et al. | 432/145 |

FOREIGN PATENT DOCUMENTS

9220232 11/1992 PCT Int'l Appl. ................ 126/21 A

Primary Examiner—Timothy F. Simone
Attorney, Agent, or Firm—Laff, Whitesel, Conte & Saret

[57] ABSTRACT

A conveyor oven module has a very low profile so that more oven modules may be stacked to give a greater baking capacity in the same "foot print" without the top conveyor being higher than the five and a half feet from the floor, which is the generally accepted maximum height for people to reach. Almost all serviceable parts are in the front of the oven. The oven modules are self-contained so that an oven module may be serviced while the remainder of the oven modules in the stack continue to operate.

39 Claims, 9 Drawing Sheets

LOW PROFILE STACKABLE CONVEYOR OVEN

This invention relates to conveyor ovens and more particularly to stackable conveyor ovens.

A conveyor oven is one with a relatively wide conveyor belt extending through a heated tunnel formed in the oven. The conveyor travels at a speed calculated to cook or bake a product during the time period required for the conveyor to carry it through the oven. Another product requiring less time to bake may be placed on the conveyor at a point partway through the oven so that it only requires a fraction, say half, of the time to travel through the oven. A pizza is an example of a product which might require the full amount of baking time in order to be baked in the oven. A sandwich is an example of a product which might require a half of the full baking time.

The overall physical dimensions of floor space in the kitchen of a restaurant determines the maximum allowable "foot print" for any given oven. For example, perhaps one hundred and twenty inches is the maximum length of an available "foot print"; then, perhaps one hundred and ten inches is the maximum length of an oven that can rest on that "foot print", allowing room for the conveyor to project beyond each end of the oven. This "foot print" means that the oven itself is a maximum of 70-inches long.

The maximum height of a conveyor through the oven is fixed by the height of the people who may be required to place a product on and remove it from the conveyor. As a practical matter, this means that the uppermost surface of a top conveyor cannot be higher than about five and one half feet off the floor ($5' \times 6''$). All of these specifications mean that the oven manufacturer has to package a maximum amount of baking capacity within a limited footprint and height.

Therefore, to increase baking capacity, the manufacturers of conveyor ovens provide modular units which may be stacked one on top of the other. If a manufacturer succeeds in designing a low profile oven (such as that shown in U.S. Pat. No. 5,025,775) which is shallow enough to stack three ovens on top of each other, adding the fourth oven becomes a much greater challenge since the height of each of the three already shallow, low profile ovens must be further reduced by approximately one third. Soon one is looking for fractions of inches where ever they may be found in order to accommodate that reduction of one-third of the total height.

Still another point relates to the relatively high temperatures of oven parts and to the expansion and contractions as the oven heats and cools. For example, if the space where electrical and electronic controls are most conveniently mounted should reach, say 200° F. or more, the cost of the electrical and electronic components that will survive at that temperature would likely become prohibitively expensive. Furthermore, stacking ovens exacerbates the temperature problem on the uppermost oven. For example, one manufacturer of stackable ovens supplies an insulated canopy or shroud to completely enclose the stack of ovens. Thus, the electrical and electronic components must be put not only where they are easily accessible and serviceable, but also where they are relatively cool.

Another challenge becomes one of providing a practical design for easy service and maintenance. It might or might not be easy to shrink the oven size if it is possible to simply place parts into any convenient location within the oven. However, it would then be necessary to roll the oven away from a wall or to swing it around to get at these parts. This becomes difficult because four ovens are extremely heavy and because gas and electrical lines which are connected to the oven limit the distance over which the oven can be so moved. Also aisle space is generally at a premium in a restaurant. Thus, it would be better to be able to repair the oven without having to move it.

If one of the four ovens should be in need of servicing, it would be better if the other three ovens could remain operative. This means that the service man and the cooks and bakers have to work on the ovens without mutual interference. This problem is magnified since the internal oven temperature may reach temperatures in the order of 700° F., for example.

For these and other reasons, it becomes very difficult to provide new designs of low profile, stackable, modular ovens, so that more ovens may be stacked in the "foot print" which is reserved for ovens in most restaurants.

Accordingly, an object of this invention is to provide new and improved conveyor ovens. Here, an object is to increase the baking capacity within the acceptable or existing "foot print" that may be devoted to an oven. In this connection, an object is to provide a modular oven with a low profile so that a greater number of ovens may be stacked vertically over the same "foot print".

Another object is to provide a conveyor oven which may be serviced without having to move the oven except in very rare instances. Here, an object is keep in service a maximum number of the ovens during periods while one or more of the ovens are being serviced. In particular, an object is to locate oven parts so that almost all of them may be serviced from the front of the oven.

Still another object is to provide a basic modular oven design which may be made larger or smaller without making any substantial changes in the design.

In keeping with an aspect of the invention, these and other objects are accomplished by providing modular conveyor ovens which may be stacked one on the other. The stack begins with a rolling platform that receives and supports up to four stacked ovens. A feature is a front mounted vertical manifold system which supplies gas to each modular oven. The modular oven uses a number of vertically oriented space saving techniques which when used in conjunction with each other provide a total savings of vertical height which is enough to enable four ovens to be stacked within the acceptable height limit. Installation and serviceability are also greatly improved. All controls and most serviceable parts are positioned behind an access panel in the front of the module. Another important feature of the modular oven involves a novel air path for flushing the controls and the window area, especially the electronic components, with a constant flow of cool air while forming an air curtain to prevent an intrusion of high temperature oven air into the electronic control compartment.

Air is forced into the front access controls area by cooling fans which pressurize the air in this area relative to the air pressure in the surrounding room. Some of the volume of air picks up heat from the electrical components. Some of the pressurized air is forced out of slots at the ends of the oven to form an air curtain in front of the conveyor that directs hot oven air away from the front of the oven and controls area. The remaining quantity of pressurized air which is forced into the controls area is directed into an interstitial space above and between the stack of two ovens (or the oven and its top cover) to remove heat conducted by the metal oven surfaces inside the oven chamber before it reaches the outside front of the oven, thus keeping the operator contact surface below a 125° F. or "startle" level. In fact, the inventive oven is cool enough to allow one to hold his hand on the outside surface of the oven.

To maintain an effective flow of cooling air, the air in the interstitial space is directed back into the room through slots located above the adjacent oven door for simultaneously creating another curtain of air that washes away hot air from the door recess area.

Preferred embodiments of the invention are shown in the attached drawings, in which.

Figure 1:
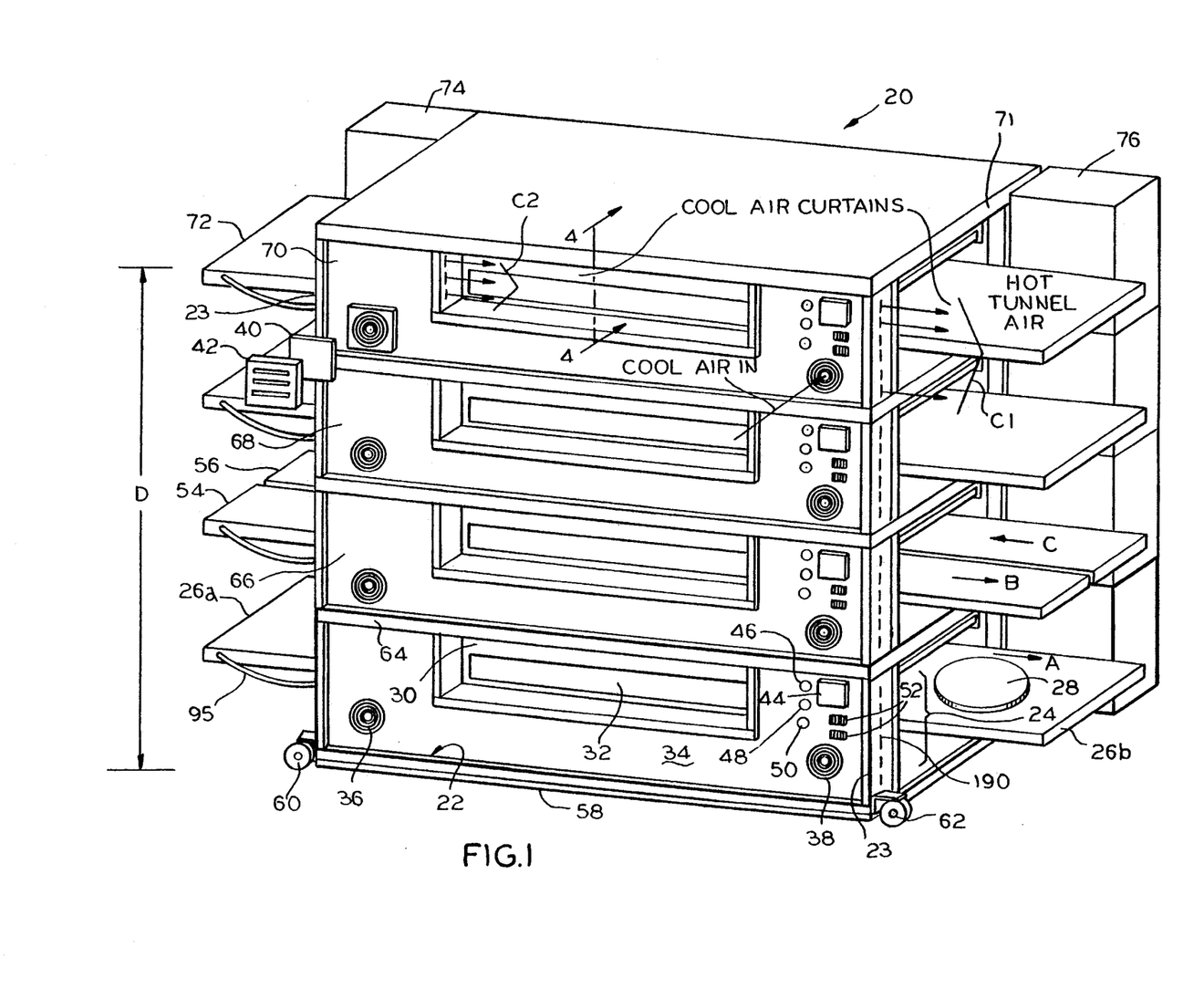
FIG. 1 is a front perspective view of four ovens stacked one above the other.

FIG. 1 shows a stack 20 of four conveyor oven modules, one of which modular ovens 22 is outlined in heavily inked lines for easy identification. It is important to note that the control knobs, fans, and all other parts on the front of the oven are recessed relative to the frame 23 of the oven so that nothing vulnerable is projecting beyond the frame to be struck if someone moves to close the front of the oven. For example, pizzas are often stacked on rolling carts which might brush against the front of the oven.

Each oven module has a conveyor 26 which extends through a heated tunnel 24. The conveyor 26 is a full width, endless belt which travels in direction A through the oven tunnel 24. A product, such as a pizza 28 is placed on the ingoing end 26a and removed from the outgoing end 26b of the conveyor. The speed at which the belt moves is coordinated with the temperature in the oven tunnel 24 so that the emerging pizza 28 is fully cooked.

A door 30 contains a glass panel 32 so that the cook or baker can view the product as it travels through the oven. Also, the baker may open the door 30 to place a product on the conveyor 26 if less than a full bake cycle is required. For example, it might take half as long to bake a certain bread product (such as a hot sandwich) as it takes to bake a pizza. In this case, the baker may open the door 30 and place that product at a midpoint on the conveyor belt 26, thus causing it to spend half the usual time in the oven.

An access panel 34 is hinged to swing down (FIGS. 2, 3) and expose a channel CH containing the inner and control parts of the oven for servicing or to swing up (FIG. 1) during operation in order to conceal and protect said inner and control parts. This access panel 34 and the channel behind it has all serviceable components except for the hot air blowers (and parts directly associated with them) and the oven temperature control sensor.

Two fans 36, 38 (FIG. 1) are located on opposite each ends, respectively, of front access panel 34 in order to drive a draft of cool air over the various controls and other parts located in the channel behind the access panel. An important consideration is that the fans 36, 38 are far enough inboard from the ends of the heated tunnel 24 so that a hot oven exhaust air is not sucked into the cooling channel behind front access panel 34. The air exits the channel area through slots 35 on both ends of the oven and in front of the conveyor 26, thus creating a curtain C1 of relatively cool air blocking the hot tunnel oven air and keeping it away from the front of the oven. A second curtain C2 of cool air may be blown out of slots 37 and across the front of door 30. These air curtains may be provided on both ends of the oven and either beside or over the door. As shown at 40, a filter may be positioned over each cool air fan 36, 38 and held in place by a suitable snap-on ecutchion plate 42.

The controls include microprocessors 44 (FIGS. 1-3) which is programmed to control the entire baking process. The oven temperature may be selected by knob 46. The knob 48 controls the hot air blower. Knob 50 switches the conveyor off/on. Two thumb wheels 52 are provided to separately control the speeds of two conveyors. Normally only one conveyor is used. However, certain specialized problems may make two conveyors a preferable design. For example, perhaps a conveyor beginning at 26a may travel at one speed to the center of the oven while a second conveyor beginning in the center of the oven and ending at 26b may travel at a different speed. Or the conveyor could be longitudinally split, as shown at 54, 56, so that one conveyor 54 carries a product in direction B while the other conveyor 56 carries a product in direction C. This might enable one product to pass through the hottest part of the oven at the start of its journey and another product at the end of its journey; or, one of the conveyors 54, 56 may travel at one speed to bake one kind of product and the other conveyor to travel at a different speed to bake another kind of product.

Depending upon the number of ovens in the stack, the stacked ovens may rest on a rolling platform 58 mounted on four wheels, two of which are numbered 60, 62. If only one oven is used, it may be mounted on a table having legs (FIG. 18) placing the work surface (conveyor) at a comfortable height. With the described rolling platform 58 or table (FIG. 18), it is relatively easy to roll an entire stack of ovens even though each individual oven may weigh as much as between one-half and one ton.

The platform 58 or table (FIG. 18) is both a support and a thermally insulated bottom wall of the first oven module 22. The oven 22 has an upper panel 64 which functions as a corresponding bottom wall for the next oven 66 in the stack. In a similar manner, ovens 68, 70 are added to the stack. An upper platform 71 is a thermally insulated top to the uppermost oven. If only one module is used, it will be used with both the bottom insulation (platform 58 or table) and the top insulation 71.

The overall height of the stack of ovens has a practical limit D (FIG. 1), which is fixed by the height of the people who may work with the ovens. That is, the upper surface of the highest conveyor 72 should be no more than about five and a half feet above the floor.

Only the hot air blowers and a plenum temperature sensor are located in the back of the ovens. There is one hot air blower on each end of the oven, the blowers being driven by individually associated motors located in housings 74, 76 on the end of each oven.

Figure 2:
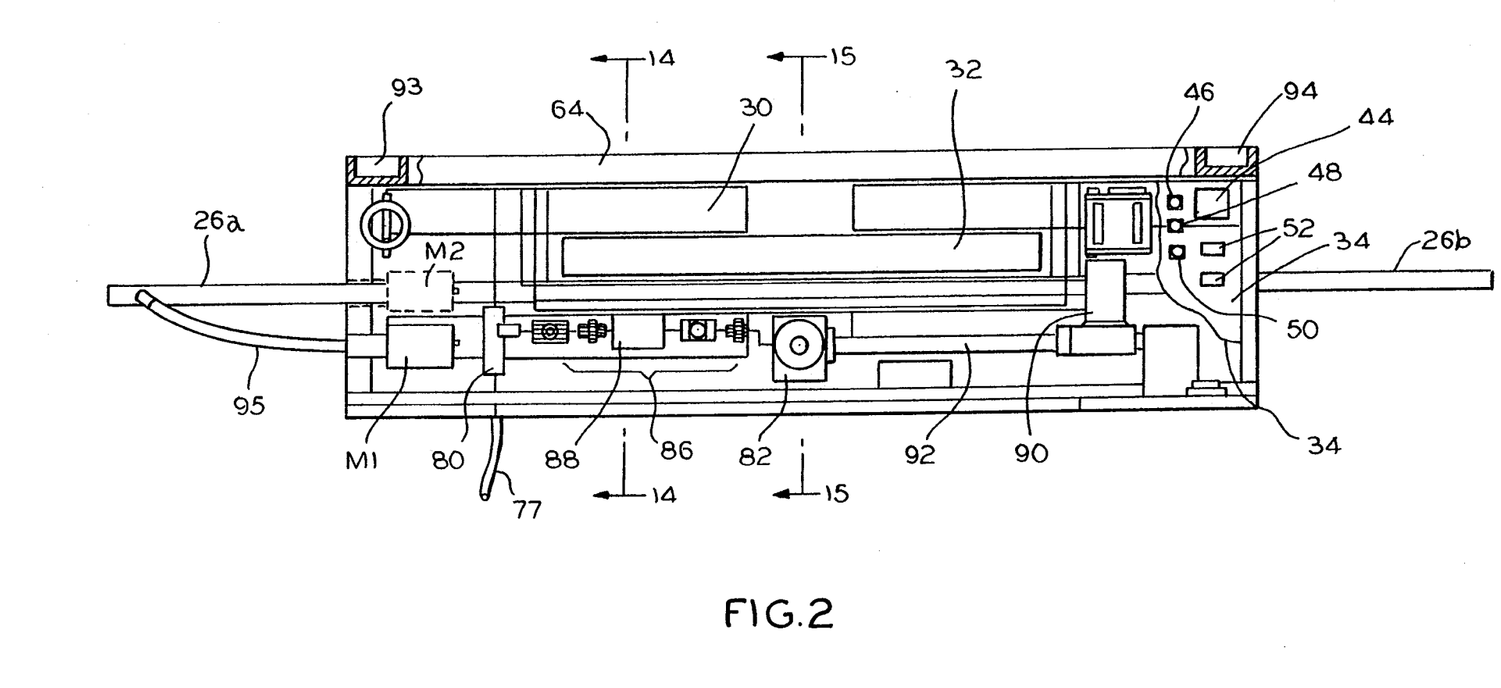
FIG. 2 is a front elevation of a single oven with a fragment of its access panel shown to indicate the location of manual operator controls.
Figure 3:
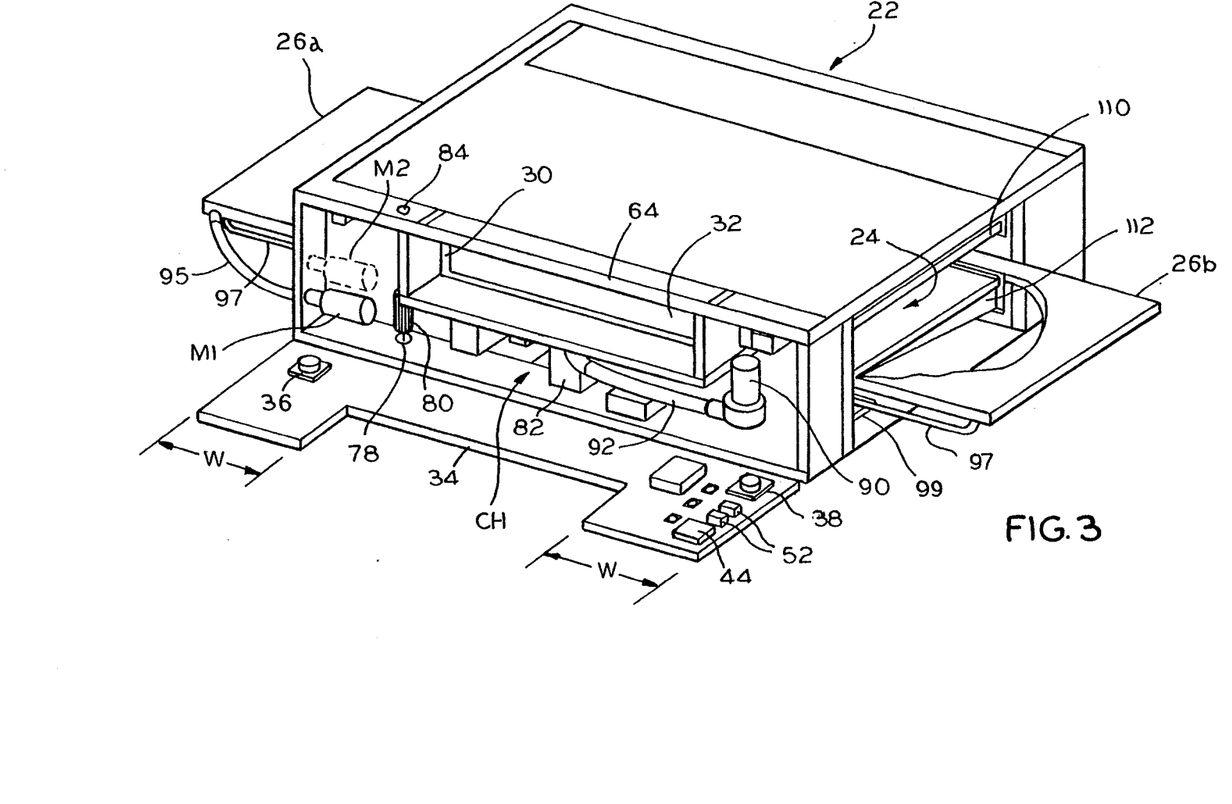
FIG. 3 is a perspective view similar to FIG. 2, but with the front access panel opened.

FIGS. 2, 3 illustrate the construction of a single modular oven. A flexible hose, gas line 77 (FIG. 2) enters the stack of ovens from a position below the rolling platform 58 or table. A hole 78 (FIG. 3) is provided in the bottom of the lower most oven module and rolling platform 58 or table to receive a manifold pipe 80 for carrying the gas to a burner 82 which extends perpendicularly back under the heat tunnel 24 in the oven and parallel to the ends of the oven. If another oven is positioned above this module, a hole 84 is provided in the top of the oven to carry the manifold vertically to the next higher oven. In like manner, the vertical manifold represented by pipe 80 carries the gas to each oven in the stack. A main gas valve is shown at 88. The gas is carried through the usual components 86 (FIG. 2) found in most gas fired ovens, such as an individual manual shut-off valve for each oven in order to isolate it during servicing.

It should be noted that manifolds are usually placed in the rear of the oven because they are aesthetically unsightly and cumbersome. However, if placed in the back, there is a reduced opportunity to service the oven from the front. Here, the vertical manifold represented by the pipe 80 is concealed by the access panel 34. Thus, the convenience of front serviceability is preserved without simultaneously introducing an unsightliness.

The particular oven which is described herein may be made in any of many different sizes without requiring any substantial effort at redesign. Usually, conveyor ovens of the described type are either 70-inches or 54-inches long. However, they may be given any suitable size.

The controls, blowers, microprocessors and the like may be identical for all sizes of ovens. In greater detail, in FIG. 2 a number of elements are shown at 80, 86, and 92 as being interconnected by pipes or conduits which may be made longer or shorter to change the length of the oven. The width W (FIG. 3) in the center of the front access panel 34 may be made wider or narrower to accommodate the differences in length of the oven. The remainder of the oven body parts may become two or three standard size panels that the manufacturer uses in many different types of ovens.

The electrical system is primarily on the right side of the oven. In general, the controls, knobs, and thumb wheels are preferably mounted on the front access panel 34 in this embodiment. The parts accessed less often, such as fuses, junction boxes, and the like, are mounted on the oven wall behind the front access panel 34. The various electrical wires run along a trough forming the bottom of the channel behind access panel 34. These wires interconnect the electrical parts in the front of the oven (i.e. the parts visible in FIGS. 2, 3).

The air for the burner is supplied from a blower 90 through a conduit 92 to the burner 82. This blower removes some of the air driven into the cooling channel cabinet by the fans 36, 38 (FIGS. 1, 3) while the remainder is exhausted through vent slots 35, 37 at each end and in front of the door of the oven. Hence, with the two fans 36, 38 blowing air into and blower 90 sucking air from the channel behind front access panel 34, there is a constant stream of cool air flushing the channel formed behind the access panel. This both cools panel 34 to protect the worker near the oven and cools the components behind panel 34 and especially the electronic components.

The electrical wires also run to the back of the oven in order to connect the controls through channels 93, 94 (FIG. 2) in the top panel to the hot air blowers and sensors. These channels 93, 94 also provide mechanical strength so that the oven may be lifted by a special hoist, which is somewhat similar to a fork truck. With the channel 94 used for lifting the oven, the entire oven may be moved by two men. The comparable ovens in the prior art required as many as about eight men to move them.

FIGS. 2, 3 show two conveyor motors $M_1$, $M_2$. Usually, only one motor is provided since there usually is only one conveyor 26a, 26b. However, if there are two conveyors (such as 54, 56 (FIG. 1)), each is driven by a separate motor M which is controlled by its individually associated thumb wheel and controller 52. A flexible Bowden cable drive 95 (one example of which is sold under the trademark "Flexdrive") connects the motor M to a drive shaft on the conveyor 26. The Bowden cable drive 95 offers many advantages over the conventional link chain-sprocket wheel drive which is used on most conveyor ovens. Such a link chain normally requires oil or grease which must be kept away from the food. Likewise, food often spills or melts and runs when heated, which could cause problems if it gets into the chain. If food is dropped into a link chain, there could be a resulting unsanitary condition which requires a tedious and immediate clean-up before bacteria can grow. Also, a guard must be provided over the link chain and associated sprocket wheels, to protect the worker from getting caught in the chain drive. The Bowden cable also has a guard, but it is much simpler and much less expensive since there is no real hazard to guard against.

Figure 3A:
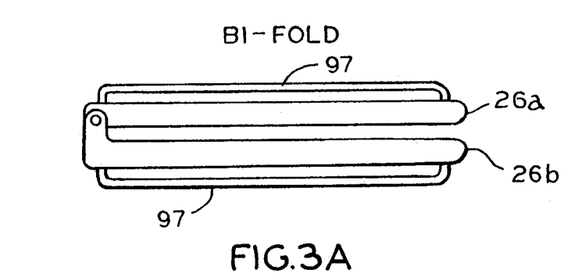
FIG. 3A shows a bi-folding conveyor that may when extended slide into and out of the oven.
Figure 3B:
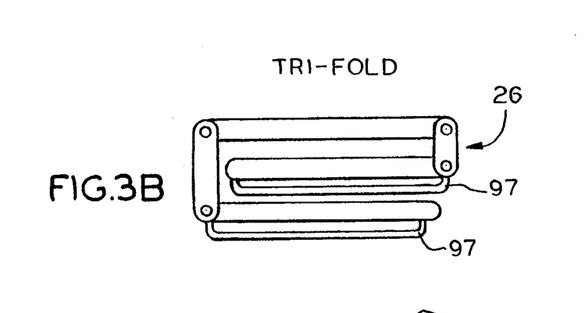
FIG. 3B shows a conveyor similar to FIG. 2, but with a tri-folding conveyor.

The conveyor 26 has a runner 97 (FIGS. 3, 3A, 3B) attached to the bottom so that it may simply slide along matching rails 99 (FIG. 3) built inside the heated tunnel 24 of the oven. This provides for easy installation and removal by simply positioning the conveyor runners on the oven rails and sliding the conveyor into place where it is latched. To further help the installation and removal of the conveyor, it may be hinged in one or two places so that after the conveyor is slid part of the way out of (into) the oven, it is folded (unfolded) and then slid the rest of the way. Since the flexdrive 95 is the only attachment between the oven and the conveyor other than a catch, it may simply be unscrewed in order to remove the conveyor, as distinguished from a link chain which must be removed, thus making it more difficult to install and remove.

Figure 4:
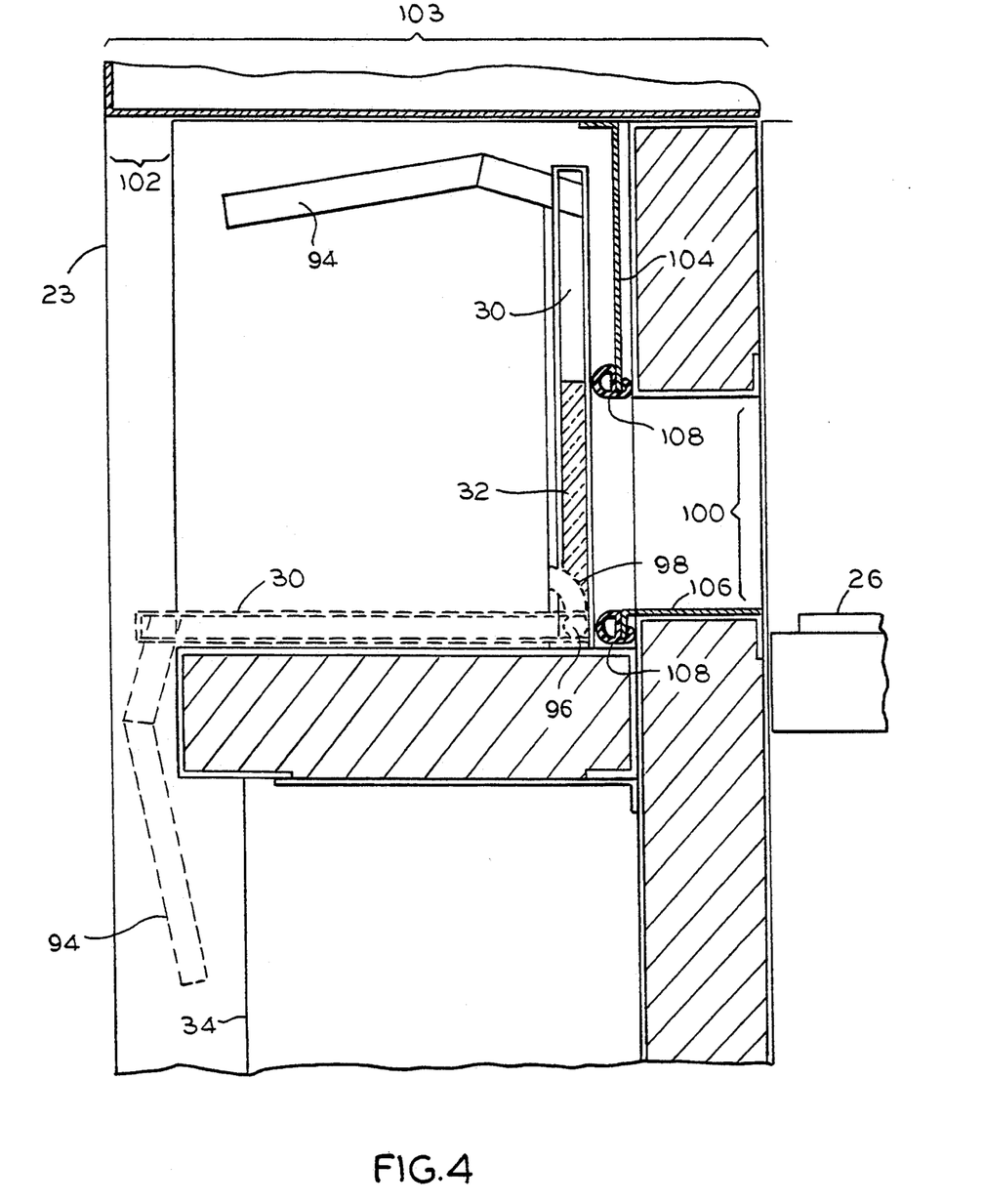
FIG. 4 is a cross-section of the oven door taken along line 4—4 of FIG. 1, with the position of the closed door shown in solid lines and the position of the open door shown in dashed lines.

The construction of the door is shown in FIG. 4 as a panel containing a heat resistant glass plate 32 and a stainless steel frame 30 having a handle 94 attached thereto. Pins project from each side of the door and at the lower corners thereof (one of which is numbered 96). In one embodiment, one of these pins on an end of the door fits into a hole in the side wall of the door frame that is built into the oven. The other side wall of the door frame has an inverted, somewhat L-shaped groove 98 milled therein to receive a second pin on an opposite end of the door. In another embodiment, the somewhat L-shaped groove 98 may be provided on each side of the door to receive the pins.

Therefore, to mount the door, one pin is placed into the hole or an L-shaped groove and the other pin 96 is dropped into the L-shaped groove 98, where gravity holds it in place. If the handle 94 is pulled, the door swings to an open position where it rests under gravity as shown by dashed lines, thus giving access to the oven through opening 100. If someone wants to put his hand in the opening 100 (for example, to lay a product on the conveyor), he does not have to reach through a space which is heated to the internal oven heat.

It should be noted that in the closed position, the door 30 is recessed behind a plane 23 at the front of the oven frame. Thus, door 30 is not damaged if something runs into the front of the oven. Finally, it should be noted that the oven wall is fairly thick (as shown at 103) to provide room for oven insulation. The door 30 is recessed so that it is at the back of this thickness. This protects the worker from inadvertently touching a hot door on the side of the oven which he might brush against.

A stainless steel metal frame 104 and 106 surrounds the opening 100 and provides a support for a gasket 108 of suitable material. When the door is in a closed position, it fits against and compresses the gasket to retain heat in the oven.

Figure 5:
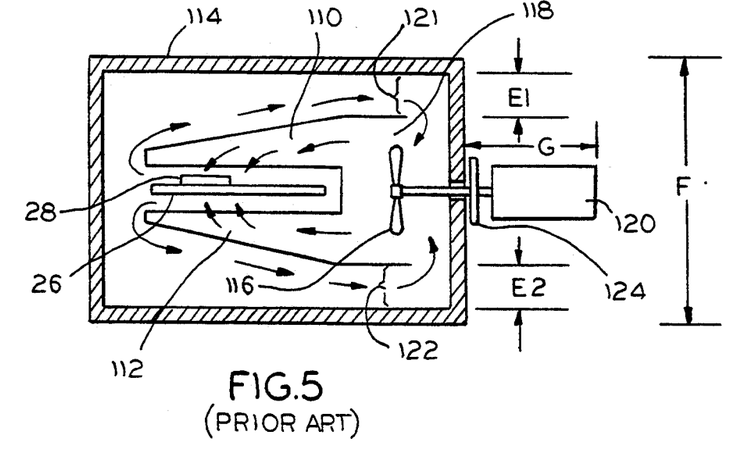
FIG. 5 is a schematic representation of a prior art conveyor oven with an axial fan.
Figure 6:
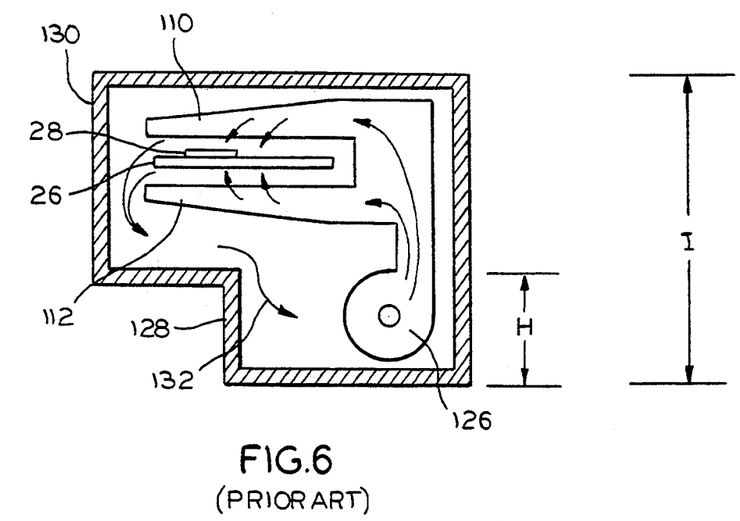
FIG. 6 is a schematic representation of a prior art conveyor oven with an centrifugal blower applied in a traditional fashion.
Figure 7:
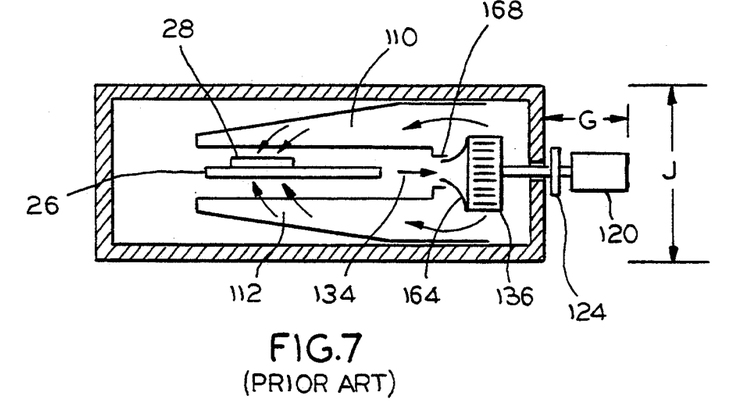
FIG. 7 is a schematic representation of a prior art oven with an air return through the fingers.

FIGS. 5-7 schematically illustrate various prior art of driving heated air through the oven. In an oven of the described type, a fan or a blower drives heated air from a burner through sheet metal ducts or hot air delivery fingers 110, 112 to bathe a product 28 while conveyor 26 is carrying it through the heated tunnel 24.

FIG. 5 schematically shows one prior art type of an oven 114. An axial fan 116 is mounted in a plenum 118 leading to the hot air delivery fingers 110, 112. A motor 120 is mounted on the back of the oven to operate the axial fan 116. The air emerging from the fingers 110, 112 returns through a space 120, 122 above and below hot air delivery fingers 110, 112. This means that a space E1 and E2 is required over and above that space which is actually required by the fingers 110, 112, per se. A result is that an oven of this construction may have a height F in the order of 24-inches.

The motor 120 sticking out the back of the oven is protected from heat by a fan-like device 124 called a "heat slinger". This motor and heat slinger adds a distance G at the back of the oven which may be in the order of at least twelve to fifteen inches and often more, thus enlarging the front to back "foot print" of the oven.

A second prior art construction (FIG. 6) places a centrifugal blower 126 in the bottom 128 of an oven 130. As compared to the corresponding depth of the FIG. 5 oven, the front to back depth of the oven is reduced by the distance G, but the height of the oven is increased by the space H required by the blower and return air path 132. As a result, the overall height I of the (FIG. 6) oven has increased and limited the assembly to a double stack (i.e. to two ovens). The schematic shown in FIG. 6 is a lower unit. An upper unit would have the blower and return air path above the oven cavity. Because of this, the upper and lower ovens do not have symmetry of performance as do those designed with blowers in the plane of the fingers.

In FIG. 7, the extra space required by the prior art for the return air is eliminated and the return air 134 is drawn between the fingers by a reverse inclined hot air blower 136. Hence, the embodiment of FIG. 7 eliminates the spaces E1, E2, and H shown in FIGS. 5 and 6. The resulting over all height J of this inventive oven (FIG. 7) is about 19-inches.

Figure 14A:
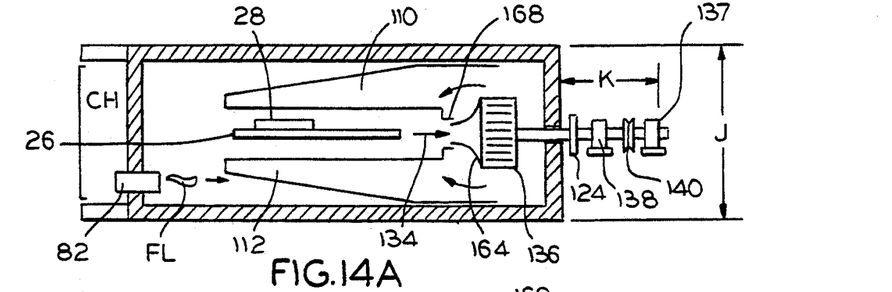
FIG. 14A is a schematic representation of a first embodiment of the inventive conveyor oven with a reverse inclined centrifugal blower used in a manner that redirects air 180 degrees from its intake keeping the profile to a minimum.

Instead of placing both a heat slinger 124 and motor 120 on the end of the hot air blower shaft as is done in FIG. 5, the invention (FIG. 14) places a heat slinger 124, two bearing blocks 137, 138, and pulley 140 behind the hot air blower. The fan drive motors are mounted on the sides 74, 76 (FIG. 1) of the oven, so an extension of the motor body and shaft can be minimized. This is also advantageous since these sides 74, 76 are cool areas. The distance K (FIG. 14) for the hot air blower drive at the back of the inventive oven is reduced to approximately five or six inches by mounting the pulley 140 between the bearing blocks 137, 138. This in turn allows for a special technique to remove the drive belt without disassembly of the drive shaft and bearings.

Figure 8:
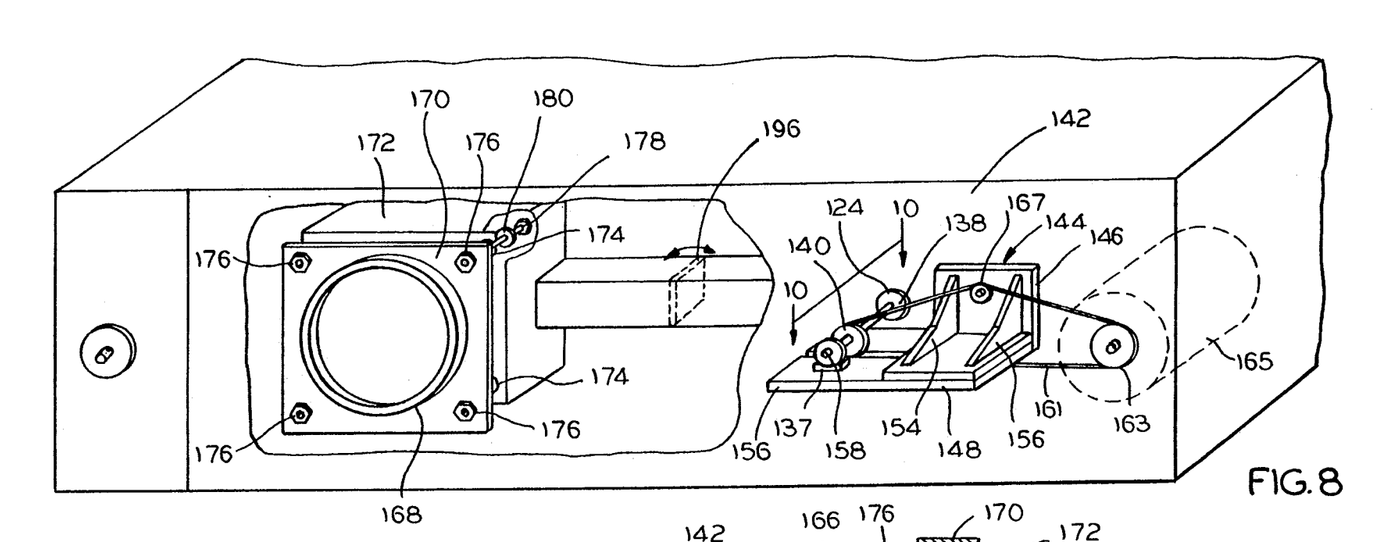
FIG. 8 is a perspective view of the back of the inventive oven.
Figure 9:
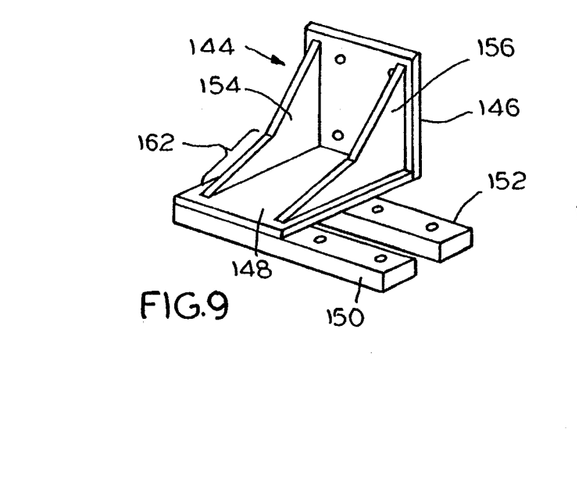
FIG. 9 is a perspective view of a unique fan bearing bracket for mounting on the back of the oven.
Figure 10:
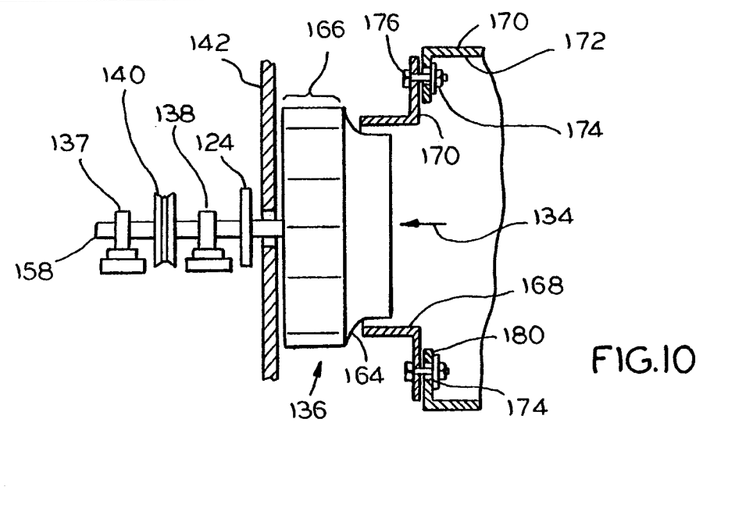
FIG. 10 is a side elevation view (partially in cross-section) of the fan bearing bracket taken along line 10—10 of FIG. 8 and the relationship of the reverse inclined blower to its adjustable inlet ring.
Figure 11:
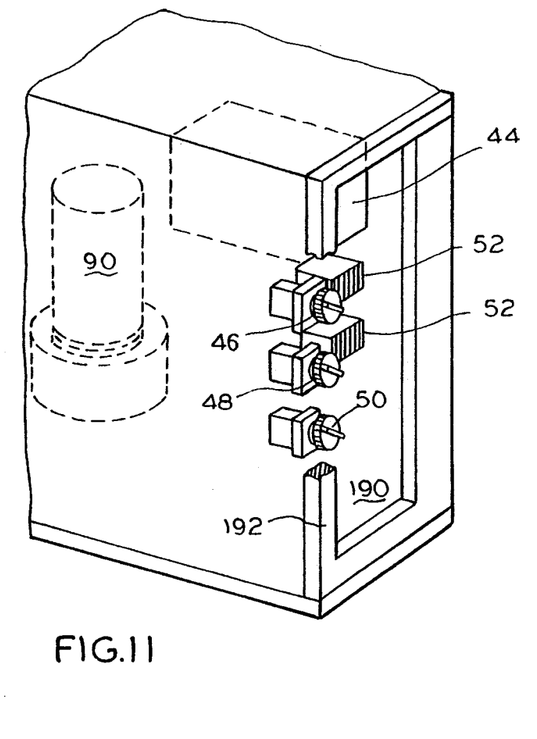
FIG. 11 is a perspective view of a fragment of a side and end of a second embodiment of the invention.
Figure 12:
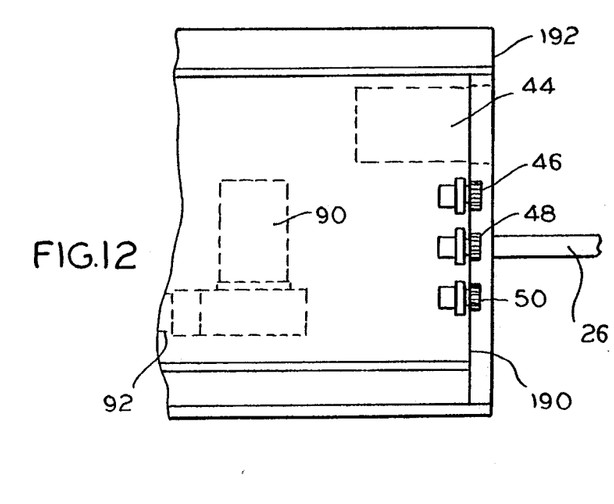
FIG. 12 is a front view of the embodiment of FIG. 11.
Figure 13:
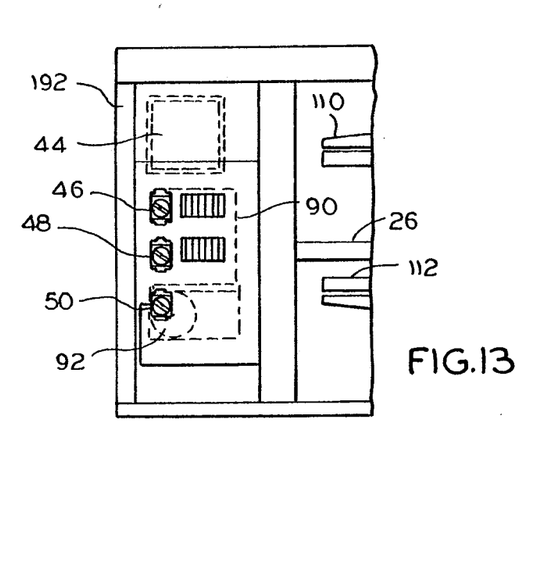
FIG. 13 is a side view of the embodiment of FIG. 11.

In greater detail, a relatively long, oven housing panel 142 (FIG. 8) is bolted onto the back of the oven. Two hot air blowers and their directly associated parts are mounted on the panel by means of separate brackets one of which is shown at 144 (FIGS. 8, 9). The bracket 144 has a back panel 146 which is bolted to plate 142. A base plate 148 having two fork tines 150, 152 is attached to back plate 146 and further supported by two stiffening member or braces 154, 156. Two bearing blocks 137, 138 are mounted on the tines 150, 152. A shaft 158 passes through bearing 137, 138 and supports pulley 140, heat slinger 124, and reverse inclined blower 136 (FIG. 10). Since the braces 154, 156 have a low profile in the area 162 (FIG. 9), a fan belt 161 may be easily trained over a pulley 163 on the motor 165 and pulley 140 on shaft 158. A spring biased idler pulley 167 may be provided to tension the fan belt 161. This use of a pulley drive reduces the required amount of clearance space in the back of the oven and enables a change in pulley diameters for special applications. For example, an oven may be operated in countries having a commercial power of either 60 Hz or 50 Hz simply by changing pulleys.

As best seen in FIG. 10, in one embodiment, a reverse incline centrifugal blower 136 has a somewhat funnel-like inner end 164 and an upstanding plenum collar 168 through which air is drawn. The blower has blades which are inclined to fling air outwardly at the periphery 166 by a centrifugal force. Then this driven air moves into the hot air delivery fingers 110 and 112 (FIG. 14). If substantially all of the air is to be drawn into the eye of the blower 136, there must be a fairly close mechanical fit between a funnel-like member 164 on the blower and upstanding collar 168 on the plenum. Still, the blower 136 should not actually touch the collar 168.

This need for a close, but non-touching, relationship could lead to extremely expensive manufacturing processes to maintain the resulting tight tolerances of mechanical positioning. The problem is exacerbated by expansion and contraction of the various parts as the oven heats and cools. To eliminate this manufacturing tolerance problem in one embodiment, the upstanding collar 168 is formed in or welded to a face plate 170. The plenum includes a box-like structure having an end which receives and secures the face plate 170. The plenum structure 172 has oversized holes 174 formed therein. The face plates 170 has nuts 176 welded thereto in the area confronting oversized holes 174. A bolt 178 and washer 180 combination (or a bolt with an oversized head) covers the entire large hole 174 and enables the face plate 170 to be drawn in tightly against the box-like structure 172 when four bolts 178 are drawn into nut 176.

To manufacture this embodiment of the oven, the blowers 136 are installed on the back panel 142 of the oven. At the time of the installation of panel 142 on the oven, the collars 168 are loosely attached to the plenum box 172. Then, a worker reaches inside the oven and moves the collar 170 until it is properly positioned relative to the funnel-like member 164 so that the blower turns freely within a relatively close fit. Next, the bolts 178 are tightened to hold the face plate 170 and collar 168 in place.

In another embodiment, the blower (FIG. 20) is made as a separate assembly which may be adjusted while on a work bench, for example. Then the assembly is bolted to the back panel 142 of the oven, with no further adjustment required.

Figures 19, 20:
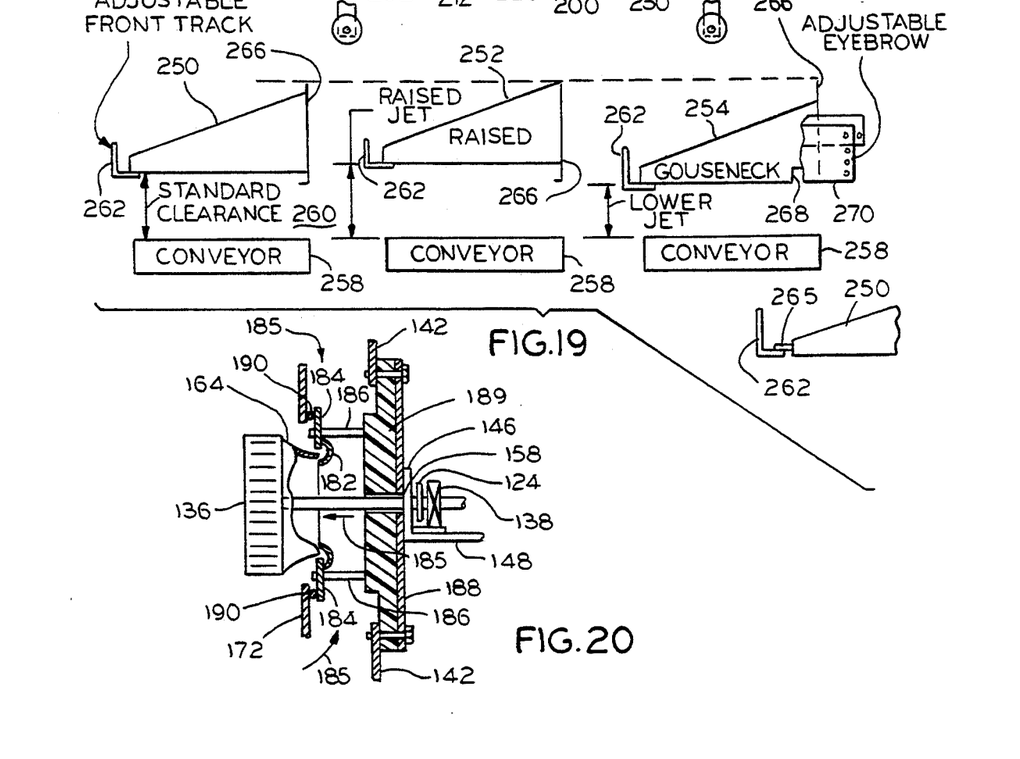
FIG. 19 graphically and schematically shows how the product clearance space may be modified in either embodiment of the invention.
FIG. 20 is an assembly, partially in cross-section, showing how the blower may be adapted to fit into the oven from FIG. 14B, when the manufacturer's tolerance of sheet metal construction is difficult to maintain.

More particularly, the blower 136 is mounted on the shaft 158, with the funnel-like member 164 fitting into an air foil 182 which guides and directs air into the throat of blower 136 without requiring too tight a fit. Air foil 182 is welded to a suitable support member such as plate 184 which is held in place by stand off bolts 186 to provide clearance for an air stream 185 to enter the back of the blower 136. The entire structure 136, 146, 186, 158, etc. is mounted on a support plate 188 which bolts onto back panel 142 so that it may be mounted or dismounted by simply installing or removing a number of bolts. A blanket of insulating material is shown at 189.

A suitable gasket 190 is mounted on support plate 188 and surrounds the hole therein, in a position where the gasket is squeezed against plenum 172. This gasket eliminates the need for accurate positioning since the area of gasket contact is completely irrelevant as long as there is an airtight seal between plates 172 and 184.

The advantage of using collar 168 (FIG. 10) is that it has a light weight and is easy to carry and move into place. The advantage of the mount of FIG. 20 is that all adjustments may be made while the unit is off the oven, as during original manufacture in a factory.

There are two blowers, respectively located, at the start and end of the tunnel through the oven. These blowers may be individually controlled to give a unique temperature profile. By installing a simple plenum damper plate or flapper 196 (FIG. 8) in the intake channel and between the two side-by-side hot air blowers, it is easy to direct more or less hot air to either side of the oven.

Another part which is directly associated with the hot air blowers is a heat sensor which detects the heat at the exhaust side of the blower. This heat sensor is also carried by the rear panel 142. The heat in this driven air cooks or bakes the product. This hot air must then return to the burner and the blower where it picks up more heat and is again driven through the fingers.

The oven described thus far has front mounted controls which are carried by front access panel 34 (FIG. 1). Sometimes this geometry may not be most desirable. For example, the oven may be positioned in a narrow hall-like area of a restaurant with some workers in a kitchen placing the product on one end of the conveyors and other workers in another room removing product from the end of the conveyor. Obviously, it would then be convenient to have controls which are accessible to a person standing at an end of the oven. There may, of course, be many other reasons why the front mounted controls are less desirable than side mounted controls.

To side mount the controls, they are moved to side panel 190 (FIGS. 1 and 11–13). To help orient the reader, the position of burner blower 90 and the microprocessor temperature controller 44 are shown by dashed lines in FIGS. 11–13. The corresponding controls 46–52 have the same reference numerals in all figures. To protect the controls 56–52 from something (such as a rolling cart, for example) brushing up against them, they are recessed behind the front surface 192 of the end frame member.

By way of review, FIG. 14 schematically shows many of the features of one embodiment of the inventive oven which have been described above, along with its air flow pattern. A protect cool air channel CH is formed at the front of the oven, to protect both the workers and the components which are more vulnerable to damage from high temperatures. The burner 82 is accessible from the front of the oven and is positioned to drive hot air into the area with a blow torch like flame FL.

The air flow pattern of FIG. 14A may be preferred by some users, depending primarily upon the characteristics of a product being baked. The impeller 136, shrouded by funnel-like member 164, sucks hot air across the product 28 on the conveyor 26, baking it in the process. The hot air is then recirculated through fingers 110, 112, from which it emerges to further bake the product.

Figure 14B:
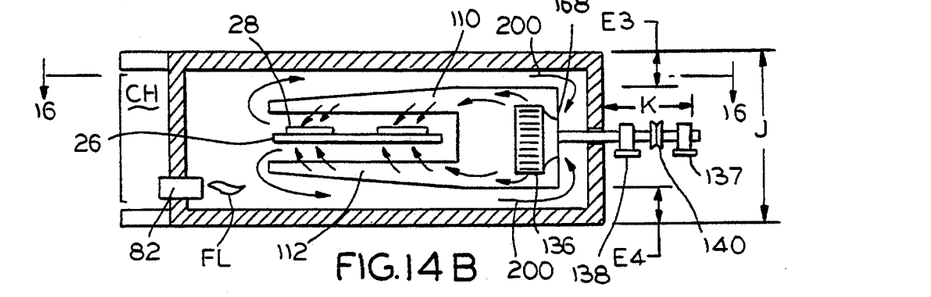
FIG. 14B is a similar schematic representation of a second embodiment of the inventive conveyor area with a normal centrifugal blower returning air along a path around at least some of the outside perimeter of the fingers.

Others who use the oven may prefer another air flow pattern such as one where the air recirculates around the outside periphery of the fingers (FIG. 14B). Sometimes the air flow pattern may be selected on a purely personal preference basis. Sometimes the air flow pattern may be selected on a basis of the characteristics of a product being baked. Sometimes the air flow pattern is selected on a basis of baking techniques used by the individual baker.

Therefore it is desirable to provide alternative air flow control structures. Accordingly, a second embodiment of the invention is shown in FIGS. 14B-18.

FIG. 14B shows an alternative air flow pattern which differs from the pattern of FIG. 14A. Primarily the difference is that in FIG. 14A, return air is drawn into the blower 136 from between the fingers 110,112. In FIG. 14B, the return air 200 moves around the outside of at least part of the perimeter of fingers 110, 112 and into the back of blower 136.

Figure 15:
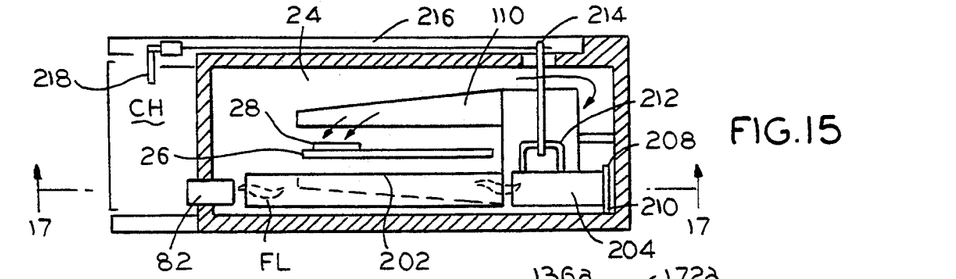
FIG. 15 is a cross-section taken along line 15—15 of FIG. 16.

As best shown in FIG. 15, a sheet metal burner tube 202 guides the flame and directs it to flow through the heat tunnel 292 across the width of the oven. The air from blower 90 (FIG. 2) drives the flame through the burner tube 202 and into the plenum 172. At the junction between burner tube 202 and plenum 172 is a flame splitter assembly 203 having a deflector plate 204 (FIG. 17) which is pivotally mounted onto a back plate 206 by a suitable hinge pin 208. Pin 208 is preferably a rod welded to the back vertical edge of deflector plate 204. The pin 208 projects far enough above deflector plate 104 to slide through an upper hole in support 206, until a bottom projection 210 of the pin drops into a lower hole. Then, the top projection of pin 208 slides downwardly through the upper hole as the deflector plate 204 settles into place.

A U-shaped member 212 is rigidly attached (as by welding) to the top of the deflector plate 204. Forked activator arm 214 fits over the U-shaped member 212 (FIG. 15) to control the position thereof. Rigidly attached to activator arm 212, a control rod 216 extends horizontally through the top of the oven to a front location where heat adjusting handle 218 is located. Therefore, if handle 218 is manually swung, it causes control rod to rotate back and forth in directions $R_1, R_2$. The forked activator arm 214 also swings back and forth in directions $R_1, R_2$. This movement of the arm 214, in turn, swings the flame splitting diverter plate 204 back and forth in directions $S_1, S_2$ (FIG. 16).

It is conceivable that something could happen to heat adjusting handle 218. Therefore, the control rod 216 has a hole therein so that a common Phillips head screw driver 219 (FIG. 17) may be inserted through the hole and used as an emergency heat adjusting handle.

Figure 16:
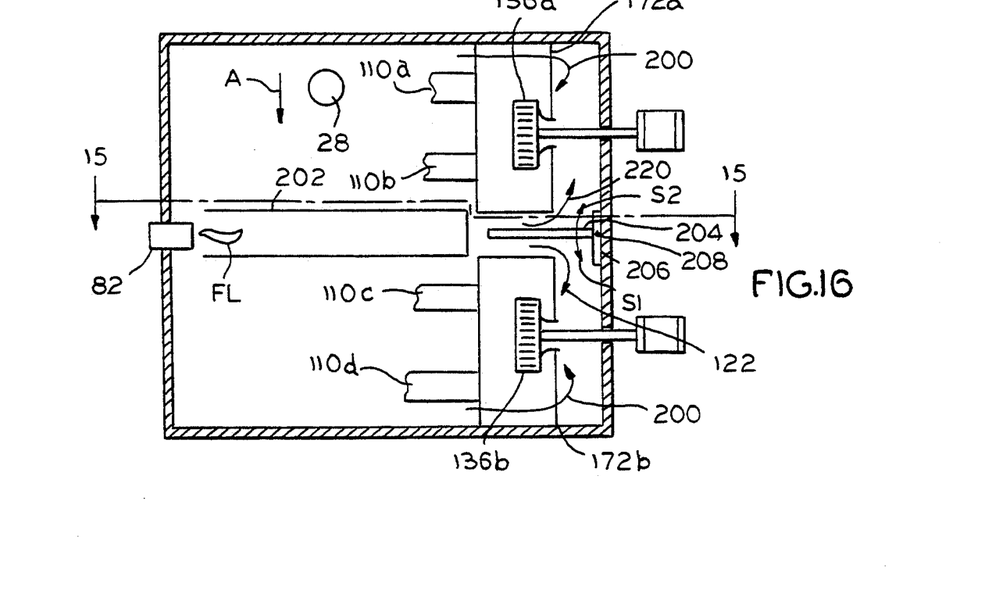
FIG. 16 is a cross-section taken along line 16—16 of FIG. 14B.
Figure 17:
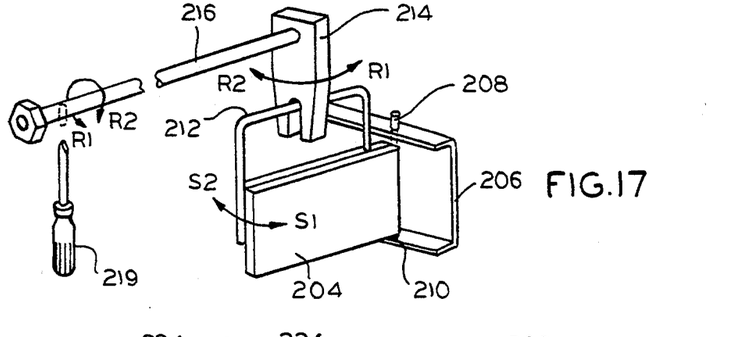
FIG. 17 is a sub-assembly of a diverter plate, taken from FIGS. 15, 16.

FIG. 16 is a top view of the oven showing the burner 82, flame FL, burner tube 202 and flame splitting diverter plate 204. There are two blowers 136a and 136b in two plenums 172a, 172b. Diverter plate 204 splits the flame into two parts 220,222. When in the position shown in FIG. 16, the flame splitting diverter plate 204 divides the flame into two, substantially equal parts so that the two plenums 172a, 172b receive substantially equal amounts of heat. If the plate 204 swings in direction $S_2$, more heat goes to plenum 172b. If it swings in direction $S_2$, more heat goes to plenum 172a.

Assume that product 28 (FIGS. 1,16) is moving through the oven in direction A. If both plenums 172a, 172b receive substantially the same amount of heat, the hot air is delivered through all four fingers 110a–110d at substantially the same temperature. If the baker wants to have product 28 initially encounter a high temperature and thereafter encounter a low temperature, diverter plate 204 is swung in direction $S_1$, splitting the flame so that more heat is delivered to plenum 172a than to plenum 172b. This means that the air emerging from fingers 110a, 110b is hotter than the air emerging from fingers 110c, 110d. Likewise, if diverter plate 204 swings in direction $S_2$, the air emerging from fingers 110c, 110d is hotter than the air emerging from fingers 110a, 110d. This setting is used if the baker decides that the product should initially encounter a low temperature and then it should be exposed to a high temperature.

The air flow pattern of FIG. 14B goes around at least part of the outside of the fingers 110, 112. As explained in connection with FIG. 5, this requires a space $E_1, E_2$ for the return air flow. Heretofore, this requirement has increased the oven height from J (FIG. 7) to F (FIG. 5). That increase has heretofore defeated the efforts to stack the ovens four high.

To overcome the problems caused by the outside air flow 200, the interior roof and floor 224, 226 (FIG. 18) of the inventive oven are scooped or shaped, as shown at 228, 230, thus providing an air passageway in the space heretofore reserved for insulation 232 without requiring the added spaces $E_1, E_2$ (FIG. 5). Therefore, the height of the oven does not increase when the air flow is around and outside the perimeter of fingers 110, 112.

Figure 18:
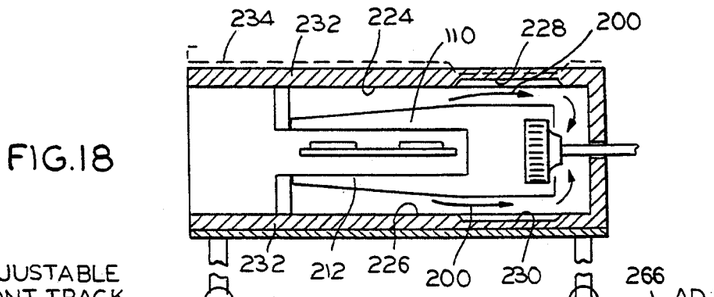
FIG. 18 is a cross-section similar to FIG. 15 showing scooped out areas in the second embodiment and in the next adjacent module.

The loss of insulation in the scooped areas 128,130 is limited to a relatively small and restricted area of the roof and floor of the inside oven wall. From one viewpoint, the insulation qualities is a balance between volume and cost because a better and more expensive insulation can be used in the scooped out areas. Therefore, by using a more expensive material to insulate the relatively limited scooped area, much of the potential heat loss caused by a thinning of insulation can be eliminated without a substantial increase of oven height. From another viewpoint, adjacent oven 234 stacked next on top, is also well insulated. Therefore, it will tend to entrap and to retain any heat escaping into it from the adjacent oven.

If all of the stacked ovens are "on" and active, there is no loss because the heat entrapped in the next adjacent oven goes to baking a product passing through it. If adjacent oven 234 is "off" and inactive, there is some amount of heat loss; however, it is small because the adjacent oven is well insulated and because the blowers in that oven are not running. Therefore, within reason, the entrapped heat tends to remain in place and more or less reach an equilibrium temperature which would tend to oppose further heat loss.

The top panel 71 and bottom panel 58 of the oven stack are well insulated, the overall perimeter of the stack is well insulated despite any internal heat loss owing to the scooped area. If there is only one oven, the top and bottom panels 71, 58 tend to prevent any appreciable loss owing to the scooped area.

Many users have their own viewpoint as to the clearance required between the conveyor, product, and the fingers at the top of the cabinet. This preference has an effect upon the height of entrance and exit of the heated tunnel through oven. FIG. 19 illustrates the way that almost any reasonable user request may be accommodated without requiring a significant change in the manufacture of the oven.

Having three standard configurations, the manufacturing company makes fingers according to the invention, the top surface of each of these three fingers having the same upper height 256 so that, at the top, they all fit into the oven in the same manner. Thus, all fingers have the same effect upon the return air. Finger 250 may be considered the standard one which is separated from conveyor 258 by a standard clearance 260. A second finger 252 is smaller in its top to bottom dimensions so that the hot air jets in its lower surface are raised from the conveyor 258 to give a greater than standard clearance. A third finger is a so-called "gooseneck" which is taller in its top to bottom dimension so that the hot air delivered through jets in its bottom surface is closer to the product or conveyor.

The front end of the finger is supported by an adjustable track 262, which may be raised for finger 252 or lowered for finger 254. In the alternative, a suitable tab 264 may be added to the front end of the finger to support it on a fixed track 262. The front tab may be located at different heights on the fingers to accommodate the different finger clearances.

On the back of each of the fingers 250-254, there is a support plate 266 having a standard configuration so that all fingers may fit into the same tracks. The raised finger is attached to plate 266 at a elevated position relative to the attachment position for the standard finger 250. The gooseneck finger is attached to plate 266 in substantially the same manner that the standard finger is attached. However, the gooseneck has a step at 268 which positions the hot air jets on the gooseneck surface of the finger much closer to the product.

At the entrance of the oven, a plate 270 (sometimes called an "eyebrow") has a number of vertical adjustment holes so that the eyebrow plate 270 may be raised for finger 252 and lowered for gooseneck finger 254. Accordingly, the vertical height of the product entrance and exit may be adjusted to fit the customer's needs.

Some customers order the oven with selected fingers installed. Other customers order two or three different finger configurations and install or replace the fingers, as needed. Since the fingers slide easily on tracks attached to the oven, it is very simple to switch the fingers.

Those who are skilled in the art will readily perceive how to modify the invention. Therefore, the appended claims are to be construed to cover all equivalent structures which fall within the true scope and spirit of the invention.

What is claimed is:

1. A low profile oven module which may be assembled to form a plurality of stackable modular ovens, said oven module comprising housing means containing a heated tunnel with a conveyor extending therethrough and having upper and lower hot air delivery fingers positioned above and below said conveyor, means including a plenum for delivering a forced draft of hot air into and out of said fingers, means for returning air issuing from said fingers back to said plenum, burner means mounted in the front of said oven and extending across the width of and toward the back of said oven, burner blower means mounted in the front of said oven and separate from said burner, and duct means extending between said burner blower and said burner for delivering forced air to said burner.

2. The oven of claim 1 wherein said means for returning air comprises a centrifugal blower having reverse or forwardly inclined blades, said means for returning air further including a path between said fingers and extending to said centrifugal blower.

3. The oven of claim 1 wherein said means for returning said air comprises a path around at least some of an outside perimeter of said fingers.

4. The oven of claim 3 wherein some of the interior walls of said oven are scooped out to provide said path around said outside perimeter of said fingers.

5. The oven of claim 1 and a centrifugal blower which has a somewhat funnel shape on the intake side and said plenum has an upstanding collar confronting said somewhat funnel shape with a close mechanical tolerance relationship, and means for adjusting the position of said collar and funnel relative to each other.

6. The oven of claim 1 and a separate assembly comprising a plate with a centrifuge blower and a motor associated therewith, gasket means on said plate for fitting against a plenum in order to eliminate a need for a close tolerance fit.

7. The oven of either claim 2 or claim 6 and bracket/brace means associated with and rotatably supporting said centrifugal blower and a pulley mounted to turn said centrifugal blower, a motor with a drive pulley mounted thereon, said motor being located at an end of said oven and remote from said bracket/brace, and a drive belt trained over said pulley mounted to turn said centrifugal blower and said drive pulley mounted on said motor.

8. The oven of claim 7 wherein said bracket/brace means comprises a support plate attached to a back of the oven, a pair of tines on said support plate and extending therefrom in a direction parallel to the back of said oven, a pair of bearing supports mounted on said tines, a drive shaft supported in said bearings and carrying said pulley which turns said centrifugal blower, and said centrifugal blower being mounted on said drive shaft.

9. The oven of claim 1 wherein there are two of said plenums, said burner means comprises a tube extending from said front of said oven to said two plenums in the back of the oven, said blower blowing a flame from said blower means to said plenums, and flame splitting means for diverting variable amounts of said flame into separate ones of said plenums at the rear of said oven.

10. The oven of claim 9 wherein said flame splitting means comprises a hinged plate, a rotatably supported rod in a top panel of said area and means responsive to a rotation of said rod for moving said flame splitting means.

11. The oven of claim 1 and a rolling platform for supporting a stack of said ovens, said modular ovens having a height such that four of said modular ovens may be stacked on said platform and still have the conveyor of the upper most oven no more than approximately five and a half feet off a floor supporting said rolling platform.

12. The oven of claim 1 and a vertically extending gas manifold running through a stack of said modular oven.

13. The oven of claim 1 and fan means for driving a cooling draft of air through a space in the front of said oven housing, said burner blower drawing said draft out of said space, and control means mounted in the space cooled by said draft of air.

14. The oven of claim 1 and means for mounting all projecting equipment on a front access panel of said oven, said front panel being recessed relative to a frame of said oven so that said projecting equipment is not touched by something brushing against the front of said oven.

15. The oven of claim 11 wherein said projecting equipment includes at least one control knob.

16. The oven of claim 14 wherein said projecting equipment comprises at least a door hinged to swing outwardly, said door having a handle to pull said door to an open position, said door and handle being recessed behind said frame in the closed position.

17. The oven of claim 1 wherein walls of said housing are relatively thick to receive insulation, door means for giving access to said heated tunnel and said conveyor in said tunnel, said door being mounted substantially in line with the heated tunnel side of said thick wall, said door and wall having dimensions such that said door lies substantially within the thickness of said wall when in both a closed and an open door position.

18. The oven of claim 16 wherein said door has pins extending from opposite ends and at a lower edge thereof, said housing having a door frame with at least one somewhat inverted L-shaped slot on a side for receiving one of said pins whereby said door may be installed and removed by placing at least said pin in said slot so that it is held in place by gravity.

19. The oven of claim 1 and means for providing alternative fingers to adjust the distance over which hot air must travel after it leaves the fingers and before it encounters a product on said conveyor, and means for adjusting a vertical opening through which said conveyor transports product through said oven.

20. A low profile modular conveyor oven for incorporation into a larger oven assembled from a plurality of said modular ovens, said modular oven comprising an insulated housing having a heated tunnel therein, a conveyor extending through said tunnel for transporting product through said oven, a front access panel on said oven, a channel behind said front access panel, said access panel being mounted to move between opened and closed positions for concealing and protecting or exposing and giving access to said channel, at least one fan mounted to drive a draft of cooling air into said channel, a burner mounted with a cool end in said channel and a hot end at least partially under said tunnel, and blower means separate from said burner for driving said air in said channel into the cool end of said burner, thereby partially exhausting said draft of cooling air from said channel.

21. The oven module of claim 20 and means for exiting the remainder of said draft at ends of the oven for creating an air curtain to block hot oven air from the front of the oven.

22. The oven module of claim 20 and a conveyor drive motor in said channel, and means comprising a Bowden cable coupled between said conveyor drive motor and said conveyor for driving said conveyor.

23. The oven module of claim 22 wherein there are two of said conveyors in said oven and two of said conveyor drive motors in said channel, and two of said Bowden cable means coupled between individually associated ones of said drive motors and said conveyors whereby said two conveyors may be driven at different speeds and in different directions by separate motors.

24. The oven module of claim 20 wherein said conveyor has runners so that it may be slipped into place or removed from said oven by sliding along side rails in the oven tunnel.

25. The oven module of claim 24 wherein said conveyor is hinged so that it may be folded as it is slid into or out of said oven so that there does not have to be enough clearance at an end of the oven to pull out or push in the entire length of the conveyor.

26. The oven module of claim 20 and channel means in said housing and over the top of said tunnel, said channel means extending across a width of said oven to provide a channel for extending at least electrical wires across said oven and to provide a hardened support for lifting said oven.

27. The oven module of claim 20 and control means including at least one manually set means mounted on a panel of said housing for manually controlling said oven from the exterior thereof, and a frame on said module oven, said frame extending beyond the manually set means so that they are not damaged by objects brushing against the oven.

28. The oven module of claim 27 wherein said panel of said oven is said front access panel.

29. The oven module of claim 27 wherein said panel of said oven is a side panel adjacent said heated tunnel.

30. The oven module of claim 20 and at least one hot air blower and parts directly associated therewith mounted on a back of said oven, and means for mounting all serviceable parts other than said blower and its directly associated parts behind said front access panel.

31. The oven module of claim 20 and means on the front of said oven for driving said conveyor.

32. The oven module of claim 20 wherein said insulated housing has relatively thick walls, and an access door in the side of said wall, said access door being mounted to move between opened and closed positions, said access door having dimensions such that it is recessed within said thick walls when said door is in at least one of said opened and closed positions.

33. The oven module of claim 20 wherein an assembly of said modular ovens are independently operated so that some modular ovens in said assembly may still be operating while other module ovens in said assembly are being serviced.

34. The oven module of claim 20 and means in a position which prevents exhaust air heated by said burner from being drawn back into said draft of cooling air.

35. The oven module of claim 20 and hot air distribution fingers within said heated tunnel, a pair of hot air blowers positioned to drive hot air through said fingers, and means for selectively distributing hot air from said hot air blowers between said fingers in order to establish a heat profile along a length of said tunnels.

36. The oven module of claim 35 wherein said means for distributing heat comprises a pivotally mounted door in a path of a flame from said burner, and means for swinging said pivotally mounted door in order to direct more of said flame to one side of the oven and less of said flame to the other side of the oven.

37. An elongated modular conveyor oven comprising an elongated conveyor in a heated compartment, a plurality of air distribution parts in a back of said oven for establishing a selectable heat profile along the length of said conveyor, means for mounting all remaining serviceable parts in a front of said oven, means for joining said parts by conduits which have lengths selected to adjust the length of said oven without requiring a redesign thereof in order to make ovens of different lengths, and means for concealing and protecting said remaining serviceable parts within a cooled chamber at the front of said oven.

38. The oven of claim 37 and a rolling platform, a stack composed of a plurality of said oven modules on said platform, a flexible hose for bringing gas into the bottom of said rolling platform and near the front of said modules, a vertical manifold extending from said flexible hose upwardly through the front said stack for distributing said gas to individual ones of said modules, and access door means for concealing said vertical manifold.

39. The oven of claim 38 wherein said rolling platform effectively is the bottom panel on the lower most one of said oven modules in said stack and the top of each oven module effectively is the bottom panel on the next higher oven module in said stack.

* * * * *